A. H. SEFTON.
COMPASS COURSE FINDER.
APPLICATION FILED DEC. 10, 1914.
1,184,579.
Patented May 23, 1916.
2 SHEETS—SHEET 2.
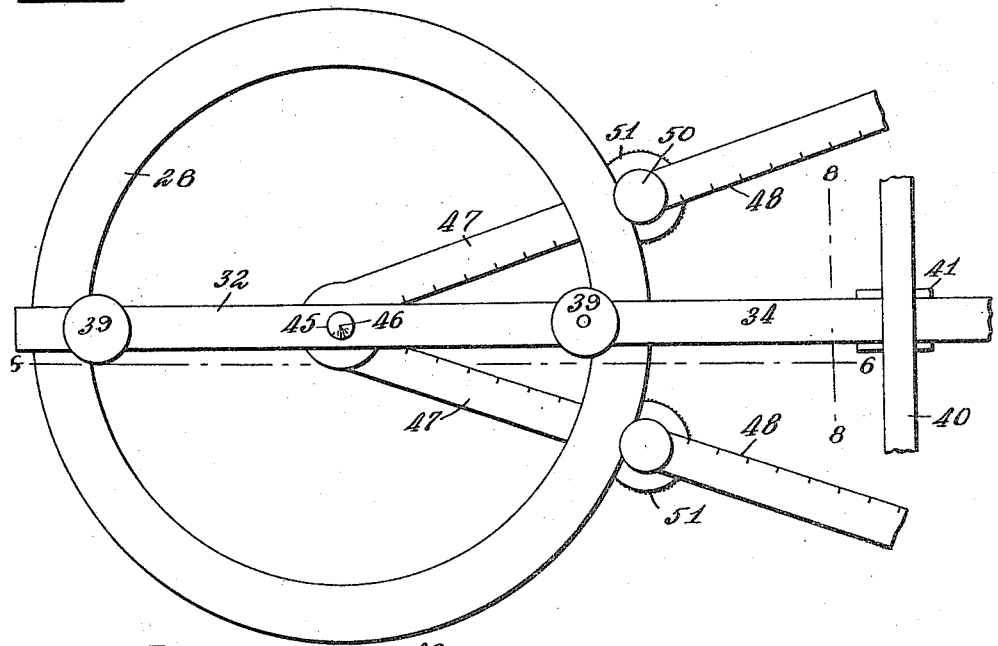

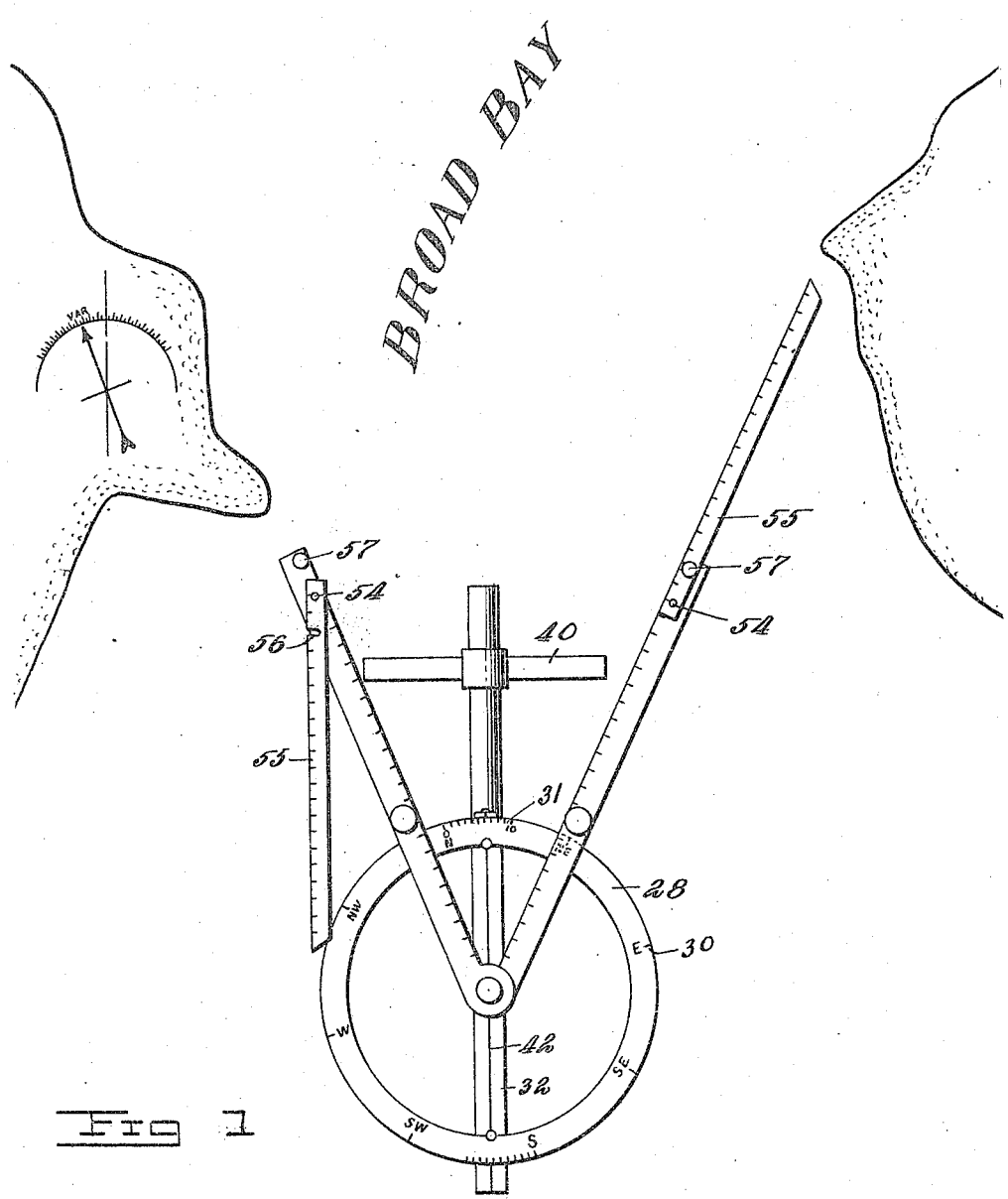

UNITED STATES PATENT OFFICE.

ALFRED H. SEFTON, OF WASHINGTON, DISTRICT OF COLUMBIA.

COMPASS-COURSE FINDER.

1,184,579.

Specification of Letters Patent.

Patented May 23, 1916.

Application filed December 10, 1914. Serial No. 876,491.

*To all whom it may concern:*

Be it known that I, ALFRED H. SEFTON, a citizen of the United States, residing at Washington, District of Columbia, have invented certain new and useful Improvements in Compass-Course Finders; and I do hereby declare the following to be a full, clear, and exact description of the invention, such as will enable others skilled in the art to which it appertains to make and use the same.

The invention relates to improvements in course finders for the navigation of vessels.

Among other objects of the invention, the same provides for a simple, compact and inexpensive device or instrument of the character mentioned which, without any previous calculation, may be used; first, for taking readings of magnetic compass courses and cross bearings from charts for use on ships' compasses; secondly, to indicate the proper course to be steered in passing from a known point to a point beyond the range of observation; and thirdly, to indicate the exact position of a vessel by a single pair of compass courses taken from the vessel to two known landmarks.

With the above and other objects in view, as will be hereinafter apparent, the invention consists in general of a protractor element or circle suitably provided with compass and degree marks mounted on an arm or plate adapted to be laid on or parallel the meridians of a chart and a plurality of arms connected to the circle and arranged in a novel manner.

The invention further consists in certain novel details of construction and combinations hereinafter more fully described, set forth in the appended claims, and illustrated in the accompanying drawings, in which:—

Figure 1 is a plan view of a chart showing a modification of the device in position thereon, Fig. 2 is an enlarged bottom view of the modification showing the protractor circle and portions of the arms, Fig. 3 is a section on the line 6—6 of Fig. 2, Fig. 4 is a similar section showing a pointer arm in alinement with what is termed the meridian bar, the view being still further enlarged and only portions of the bars adjacent the circle being shown, Fig. 5 is an enlarged section on the line 8—8 of Fig. 2, Fig. 6 is a fragmentary detail view of the hinged joint of the pointer-arms.

Reference being had to the drawings, in which like characters of reference indicate corresponding parts on the several views thereof, the preferred embodiment of the invention comprises a protractor 28 having the form of a ring and provided on its upper face with a rabbet 29 formed around the inner periphery of the ring formation. This upper face is provided with compass divisions 30 and degree divisions 31. Extending diametrically across the protractor is what is termed a meridian bar 32 which is shouldered as at 33 to fit against the under face and inner edge of the protractor ring. It is to be observed that the shouldered portion only extends a portion of the distance across the ring and that the bar is again shouldered to form an extension 34, the inner end of which is in spaced relation to the under side of the protractor ring. Furthermore, this bar is recessed as at 35 and is provided with clamp screw receiving openings 36 adjacent the inner periphery of the ring. In these openings 36 are held the shanks 37 of the clamp screws each provided with a head 38 and these heads fit within the recesses 35 and engage the rabbet 29 of the protractor ring 28. The screw shanks 37 extend through the lower face of the meridian bar 32 and on the end portions of said screw shanks are nuts 39 the under faces of which are preferably flat. These nuts 39 are provided with knurled peripheries so as to be readily rotated by the thumb and fingers. The proportions of the device are such that the upper face of the bar 32 lies in the plane of the upper or divided face of the protractor ring.

Beneath the extension 34 and perpendicular to the meridian bar 29 is what is termed a parallel bar 40, the bar lying in the direction of the parallels of latitude when the meridian bar lies in the direction of a meridian of longitude. This parallel bar 40 is of substantially the same thickness as the nuts 39 and is held upon the extension 34 by means of a guide 41 so arranged that the bar 40 will at all times be truly perpendicular to the bar 29. The bar 32 is provided on its upper face with a line passing exactly through the center of the protractor as indicated at 42 and this line, when the device is properly set, indicates a true north and south direction.

Centrally of the protractor ring, the bar 29 is provided with an opening 43 wherethrough passes a clamping screw 44 having a conical head 45 beneath the bar 29 and the points 46 of this conical head extends very slightly below the plane of the under sides of the nuts 39 and the bar 40 so that when the device is placed upon a chart the point 46 will slightly mark the paper of the chart. This clamping screw 44 extends above the bar 29 and on the upper end are pivoted a pair of pointer arms 47 so formed that each arm is provided with an edge 48 which is truly radial with respect to the protractor. Above these arms 47 is provided a clamping nut 49. The arms 47 extend outward over the upper inscribed face of the protractor ring 28 and just outside of this ring each of these arms 47 is provided with an opening to receive the shank of a clamping screw 50 having a knurled head 51. On the lower ends of these clamping screws 50 are carried threaded nuts 52, the flanged portions 53 of which extend beneath the ring 28 and these nuts are of such dimensions that either of the arms 47 may be swung past the bar 32, the nut passing above the extension 34 and its edge passing through the opening between the inner end of said extension and the protractor ring 28. Each of the arms 47 is provided at its outer end with a pivot pin 54 whereon is pivoted an extension arm 55 provided with a notch 56. The arms 47 are also provided with headed stop pins 57 adapted to engage in the respective notches 56 when the arms 47 and the extensions 55 are in alinement. These parts are so proportioned that the extension arms 55 have an edge as at 58 which will come in alinement with the edge 48 of the arms 47 when the stop pin 57 bears against the inner end of the notch 56.

In order to understand the use of the device, let it first be supposed that the position of the vessel is known but that the point to be steered for cannot be seen by reason of fog or the like. The point 46 of the head 45 is placed upon the chart indicated in Fig. 4 in the position occupied by the vessel. Previous to this the meridian bar 32 has been set for the magnetic variation. After the device has been placed upon the chart the meridian bar 32 is swung around until the parallel bar 40 can be moved along the meridian bar to coincide with the intersection points, as at 59, of the meridians and parallels of the chart. One of the arms 47 is then loosened so that it may be free to revolve and its radial edge is brought into alinement with the point to which it is desired to steer. The arm is then clamped in this position by means of the rim and central clamping nut and the course read directly from the compass indication intersected by the edge 48 of the arm in use. This will give the true compass course to be steered as the variation has been previously allowed for as above noted. The device may be left clamped in this position so that the navigator will at all times have a reminder of the course to be steered, and in event of one navigator relieving another errors in transmitting the compass course will be obviated. Furthermore, the bars 47 and 55 are, as may also be the case with the arms 18 in the preferred embodiment of the invention, provided along their edges with a scale of miles as indicated at 60, the scale being in the ratio of 1:10,000.

In using the device to determine the position of a vessel when two known points can be seen, the compass variation is allowed for as previously described by setting the meridian bar or plate. Compass sights are then taken to determine the compass bearings of the two known points and the arms 18 or 47 are set so that their radial edges intersect corresponding compass divisions on the protractor. The device is then applied to the chart in such position that the parallels of the plate 12 or the parallel bar 40 on the meridian bar 32 are in contact with two or more of the parallel and meridian intersections of the chart and the same are maintained in such position while the arms are moved around over the latter until their radial edges intersect the points on the chart corresponding to the points observed. The center pin or screw is then pressed downward so that the point makes a slight mark or puncture upon the paper of the chart which may be readily seen when the instrument is removed from the latter. This point will be the position of the vessel since it is the only point at which the radial edges of the arms will intersect the known points on the chart, while the meridian line is truly north and south.

By means of the scale of miles above described the distance of the vessel from the objective point may be measured. It will be noted that this scale being 1 to 10,000 is the largest scale employed on charts constructed to Mercator's projection as issued by the United States Government and that other charts to similar scales are multiples of this, that is to say, the ratios are 1:20,000, 1:30,000 and so forth, so that by simply multiplying the mile indications by the multiple of 10,000, which indicates the scale, the correct number of miles may be obtained. For example, if the scale indicates four and one-half miles and the scale of the chart is 1:40,000, the distance will be four times four and one-half or 18 miles. In addition to this, the scale may be used on charts constructed to the polyconic projection by noting the scale indication and measuring the minutes and fractions as laid off along the edge of said chart, the minutes, of course, corresponding to geographic miles.

There has thus been provided a simple and efficient device of the character described and for the purpose specified.

Having thus fully described the invention, what I claim is:—

1. A compass course finder comprising an annular protractor, a meridian bar extending diametrically across one face of the protractor and movable therearound, clamping means carried by said bar and engaging the protractor ring, pointer arms pivoted to said bar centrally of said protractor and engaging the other face of the protractor, and clamping means carried by each arm and engaging the protractor.

2. A compass course finder comprising an annular protractor, a meridian bar extending diametrically across one face of the protractor and movable therearound, said meridian bar extending at one end beyond the protractor ring, clamping means carried by said bar and engaging said protractor ring, pointer arms pivoted to said bar centrally of said protractor and engaging the other face of the protractor, clamping means carried by each arm and engaging the protractor, and a parallel bar slidably mounted on the extension of said meridian bar.

3. A compass course finder comprising an annular protractor, a meridian bar extending diametrically across the under face of the protractor, clamping screws extending through said bar and provided with heads engaging over said protractor, a nut on each screw on the under side of the bar, and a parallel bar slidably mounted beneath the meridian bar and having its under side substantially in the plane of the under faces of said nuts.

4. A compass course finder comprising an annular protractor, a meridian bar extending diametrically across the under face of the protractor, clamping screws extending through said bar and provided with heads engaging over said protractor, a nut on each screw on the under side of the bar, a parallel bar slidably mounted beneath the meridian bar and having its under side substantially in the plane of the under faces of said nuts, pointer arms pivoted to said meridian bar centrally of said protractor, and clamping means on each pointer arm engaging the protractor ring.

5. A compass course finder comprising an annular protractor, a meridian bar extending diametrically across the under face of the protractor, clamping screws extending through said bar and provided with heads engaging over said protractor, a nut on each screw on the under side of the bar, a parallel bar slidably mounted beneath the meridian bar and having its under side substantially in the plane of the under face of said nuts, pointer arms pivoted to said meridian bar centrally of said protractor, clamping means on each pointer arm engaging the protractor ring, and a member having a center point beneath said meridian bar and extending slightly below the plane of the under faces of said nuts and parallel bar.

6. A compass course finder comprising a protractor ring having a rabbet formed in the inner edge of the upper face, a meridian bar provided with shouldered portions fitting against the under face and the inner periphery of the protractor ring, said bar having its upper face cut away adjacent said ring, clamping screws passing through said bar and provided with heads held in said cutaway portions to engage the upper surface of the rabbet, nuts on said screws, and an extension formed on said bar projecting in alinement with the bar and in spaced relation to the under surface of said protractor ring, a pointer arm pivoted to said bar centrally of said protractor and extending outward therefrom, a clamping screw extending through the arm and having a nut engaging against the outer portion of the under surface of said ring, said nut being of such dimensions as to clear the extension of the meridian bar when the pointer is swung past said meridian bar.

In testimony whereof I affix my signature in presence of two witnesses.

ALFRED H. SEFTON.

Witnesses:
  W. PARKER REINOHL,
  J. EDWARD BANGS.